United States Patent [19]
Louis

[11] Patent Number: 5,748,306
[45] Date of Patent: May 5, 1998

[54] VISUAL ALIGNMENT INSTRUMENT

[76] Inventor: Daniel P. Louis, 657 Barber La., Joliet, Ill. 60435

[21] Appl. No.: 799,769

[22] Filed: Feb. 12, 1997

[51] Int. Cl.$^6$ .............................. G01C 5/00; G01B 11/26
[52] U.S. Cl. .............................. 356/247; 356/153
[58] Field of Search .............................. 356/138, 153, 356/154, 247, 1, 375, 152, 143, 397–399; 350/302, 293, 7; 354/165

[56] References Cited

U.S. PATENT DOCUMENTS

| | | | |
|---|---|---|---|
| 3,300,861 | 1/1967 | Lilly | 33/46 |
| 3,588,249 | 6/1971 | Studebaker | 356/4 |
| 3,684,381 | 8/1972 | Zoot | 356/138 |
| 3,813,170 | 5/1974 | Sears | 356/138 |
| 3,817,624 | 6/1974 | Martin | 356/138 |
| 3,897,637 | 8/1975 | Genho | 33/227 |
| 4,111,564 | 9/1978 | Trice, Jr. | 356/247 |
| 4,836,671 | 6/1989 | Bautista | 356/1 |
| 5,301,435 | 4/1994 | Buckley | 33/293 |
| 5,331,395 | 7/1994 | Piske et al. | 356/138 |
| 5,355,609 | 10/1994 | Schenke | 42/103 |
| 5,446,968 | 9/1995 | Okaniwa | 33/295 |

*Primary Examiner*—Frank G. Font
*Assistant Examiner*—Michael P. Stafira
*Attorney, Agent, or Firm*—Evan D. Roberts

[57] ABSTRACT

An alignment instrument for marking surfaces with divergent light planes to provide absolute visual references. The instrument is provided with first and second refracting lenses; a concentrated light beam generator; a structure for selectively and respectively positioning the lenses into, or out of, the light beam; and a reflecting means for splitting the refracted, or unrefracted, light beam to provide diverging refracted light.

18 Claims, 5 Drawing Sheets

VISUAL ALIGNMENT INSTRUMENT

BACKGROUND OF THE INVENTION

Existing known types of apparatus used by tradesmen, and others, for visually aligning structures in the building trades, and other similar environments, requiring visual alignment means typically to provide a single beam of light. The single beam of light of the known types of alignment device is often either directed in a single direction relative to the apparatus, or in the more elaborate known types, the beam is rotated in a plane to provide an illusion, to the human eye, of a plane of light, in an effort to provide a visual reference plane on structures in the path of the illusion plane.

SUMMARY OF THE INVENTION

This invention relates to a visual alignment instrument for accurately providing absolute line images relative to the instrument to allow the user to align structures relative thereto.

In addition, the structure of this invention provides diverging absolute visual line images on adjacent and/or convergent structural planes relative to the instrument.

Also, the visual alignment instrument of this invention provides diverging visual planes in a light from a single concentrated source of light.

Further, the visual alignment instrument of this invention provides diverging absolute visual line images on adjacent and convergent structural planes relative to the instrument.

Also, the visual alignment instrument of this invention provides diverging visual planes in a light from a single centered source of light without requiring any continuously revolving or similar complicated driving mechanisms.

Still further, the visual alignment instrument of this invention is capable of providing specific 90° divergent absolute planes of light relative to the instrument, or in the alternative, the same divergent 90° absolute planes of light can be projected at a 45° angle from a surface of the instrument to provide an absolute visual image for a line of tile grids or other structural materials at a 90° or 45° angle with respect to a related surface.

Another general object of the visual alignment instrument of this invention is to provide three selectable 90° diverging pairs of absolute light plane images relative to the instrument including two plane images and a solid beam image.

Other advantages and novel aspects of the invention will become apparent upon consideration of the following detailed description in conjunction with the accompanying drawings wherein.

Figure 7:
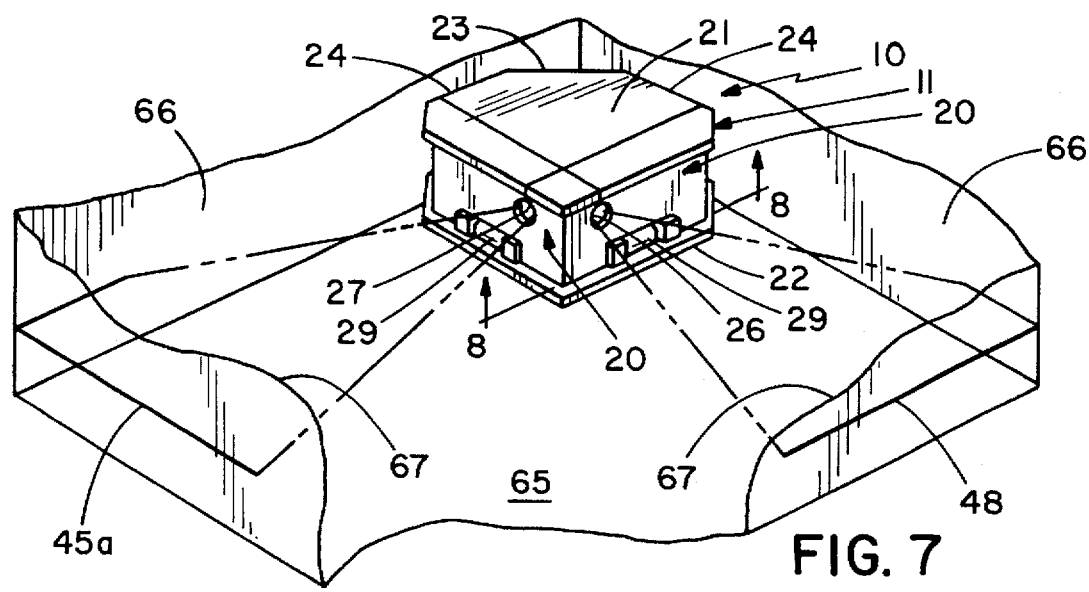
FIG. 7 is a schematic perspective view illustrating the instrument of this invention being utilized with horizontal refracting lenses in position to provide diverging horizontal planes of light.
Figure 8:
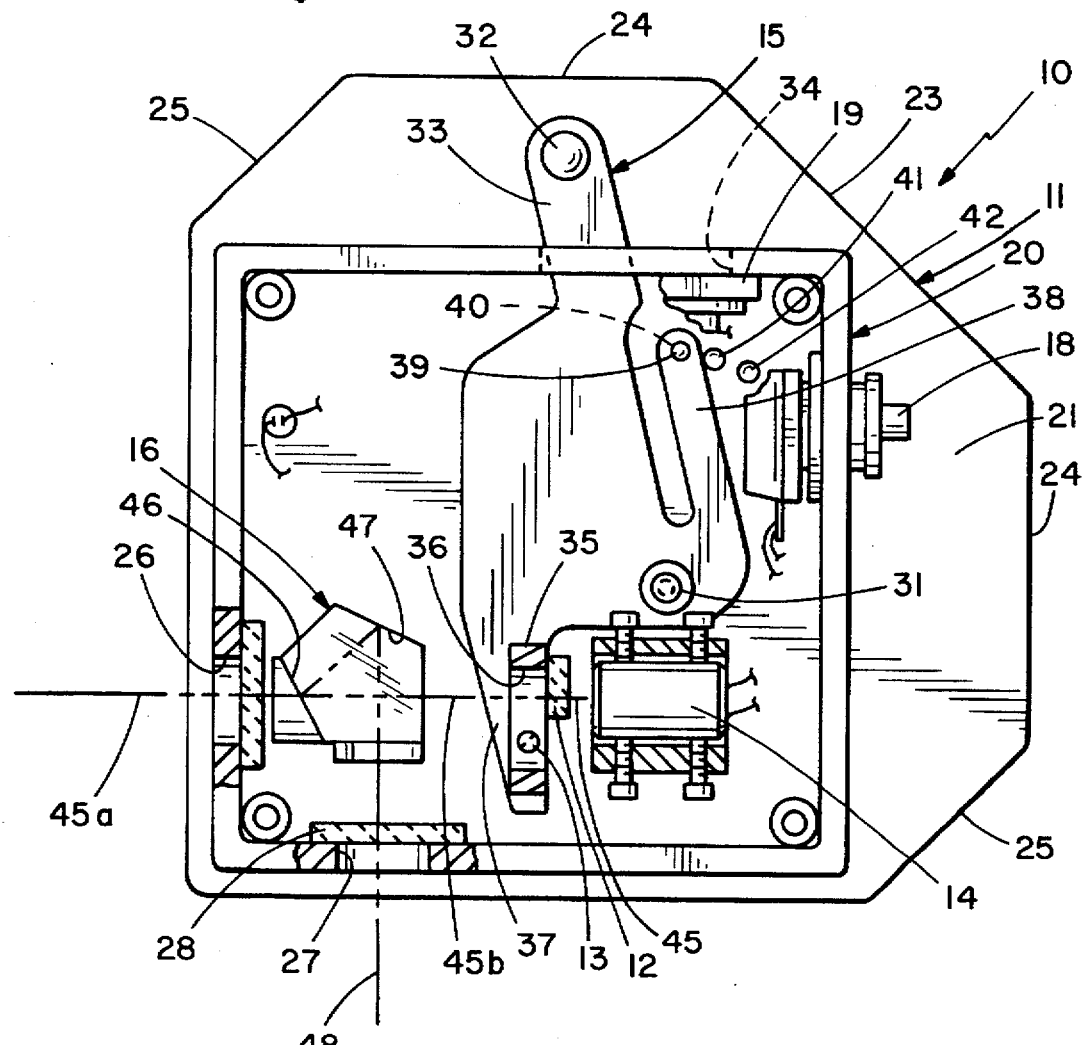
FIG. 8 is a sectional bottom view taken along line 8—8 of FIG. 7 showing the light beam source directed toward selectively positionable refracting lenses and a reflecting means showing the horizontal refracting lens in the path of the light beam for providing diverging horizontal planes of light.
Figure 9:
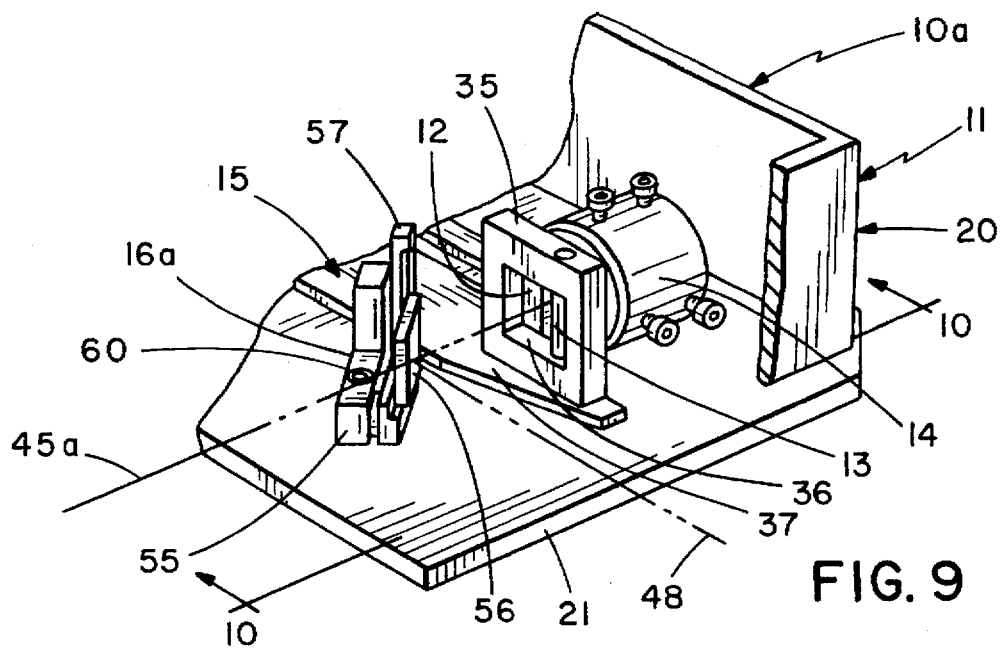
FIG. 9 is a partial perspective view of the visual alignment instrument of this invention showing an additional embodiment thereof with an alternative light plane reflector positioned in the path of the refracted light plane or the unrefracted light beam, providing diverging light beams.
Figure 10:
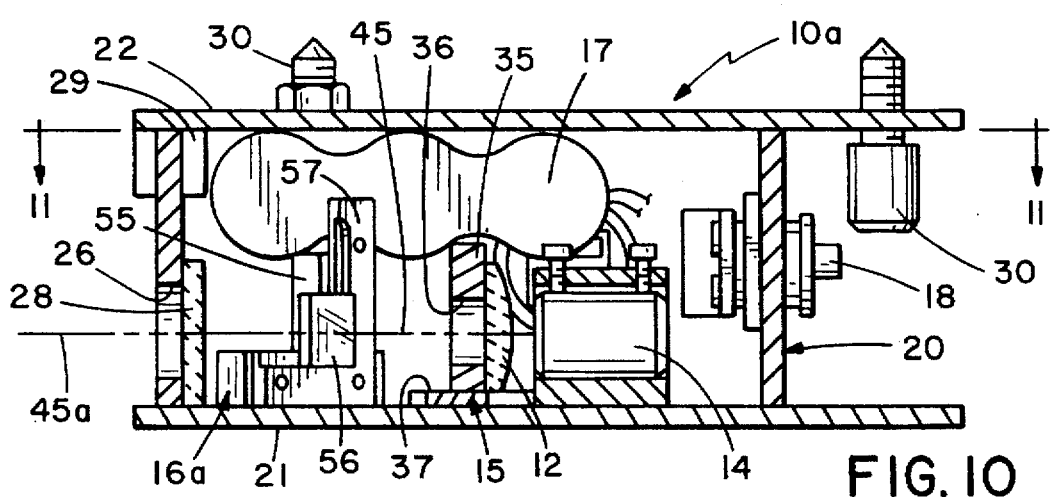
FIG. 10 is a sectional view taken along line 10—10 of FIG. 9 showing the position of the alternative light reflector in the path of the refracted light planes or the unrefracted light beam.
Figure 11:
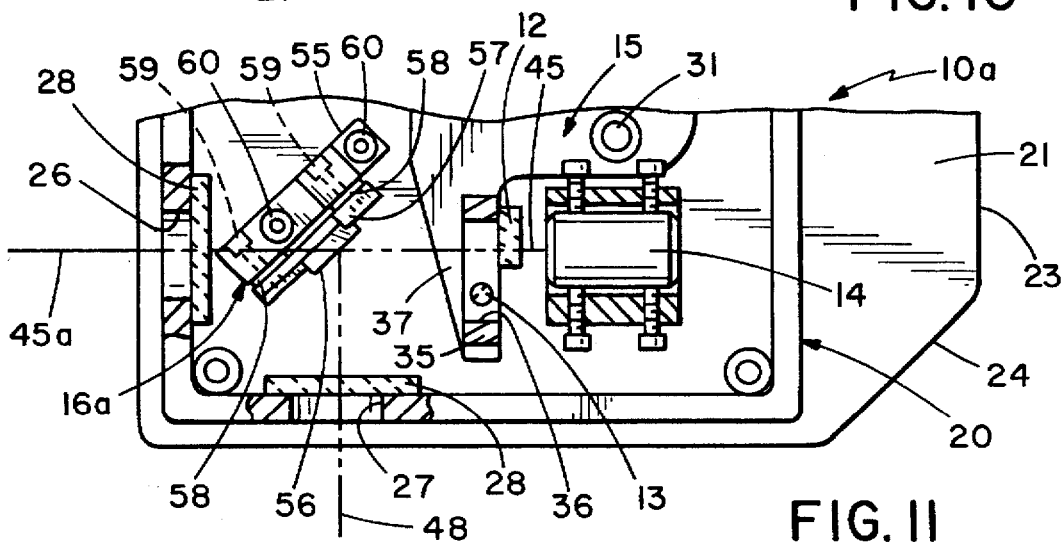
FIG. 11 is a sectional view taken along line 11—11 of FIG. 10 showing the refraction positioning mechanism with the vertical refraction lens in the line of the light beam and the alternative reflector positioned beyond the vertical refraction lens.

The visual alignment instrument of this invention is generally designated by the numeral 10 (FIGS. 1–8), and a second embodiment thereof generally designated as 10a (FIGS. 9–11). Instruments 10 and 10a generally comprises a body frame 11, first refracting light lens 12 (FIGS. 2–4, 6, and 8–11), second refracting light lens 13 (FIGS. 2, 4, 6, 8, 9 and 11), concentrated light beam generator 14 (FIGS. 2–4, 6 and 8–11) such as a laser generator, lens positioning lever 15 (FIGS. 2–4, 6, and 8–11) and reflecting element 16 (FIGS. 2–4, 6 and 8).

A power supply including a nicad battery pack 17, switch 18 and charging jack 19 are connected to light beam generator to typically power same. Body frame 11 is preferably constructed from aircraft aluminum alloy for strength and light weight, and consists of an enclosure 20 (FIGS. 1–11) positioned and retained between upper top plate 21 (FIGS. 1, 3–5, and 7–11) and lower bottom plate 22 (FIGS. 1–8, 10 and 11).

Top plate 21 and bottom plate 22 extend laterally beyond enclosure frame 20, and particularly, considerably beyond enclosure frame 20 on two sides (FIGS. 1–11) to allow for large corner bevel surface 23 at 45° to extended edge surfaces 24 (FIGS. 1, 2, 4–8, 10 and 11) of top and bottom plates 21 and 22. Similarly, beveled edges 25 are provided on upper and lower plates 21 and 22.

Enclosure 20 is provided with light beam exit openings 26 and 27 (FIGS. 1–3 and 5–10) spaced inwardly from a corner of enclosure 20 and covered on the inside by nonrefracting glass 28 (FIGS. 2, 3, 6, 8 and 11). Level indicators 29 are provided on adjacent sides of body 11 to indicate the level of instrument 10. Three pedestals 30, two of which are adjusting thumb screws, are positioned through lower plate 22 at three places to provide a support plane that is adjustable, by the thumb screws, to level instrument 10 and 10a according to level indicators 29.

Lens positioning lever 15 (FIGS. 2–4, 6, and 8–11) is pivotally secured at 31 (FIGS. 2, 6, 8 and 11) to top plate 21. A manual adjusting knob 32 is secured on lever end 33 of lever 15 extending through slot opening 34 of enclosure 20. A lens mount 35, having a light beam opening 36 (FIGS. 2–4, 6 and 8–11) is provided on a retaining arm 37 of lens positioning lever 15, and is adapted to retain first lens 12 and second lens 13 with a light beam passage space therebetween (FIGS. 2, 4, 6, 8 and 11).

Figure 1:
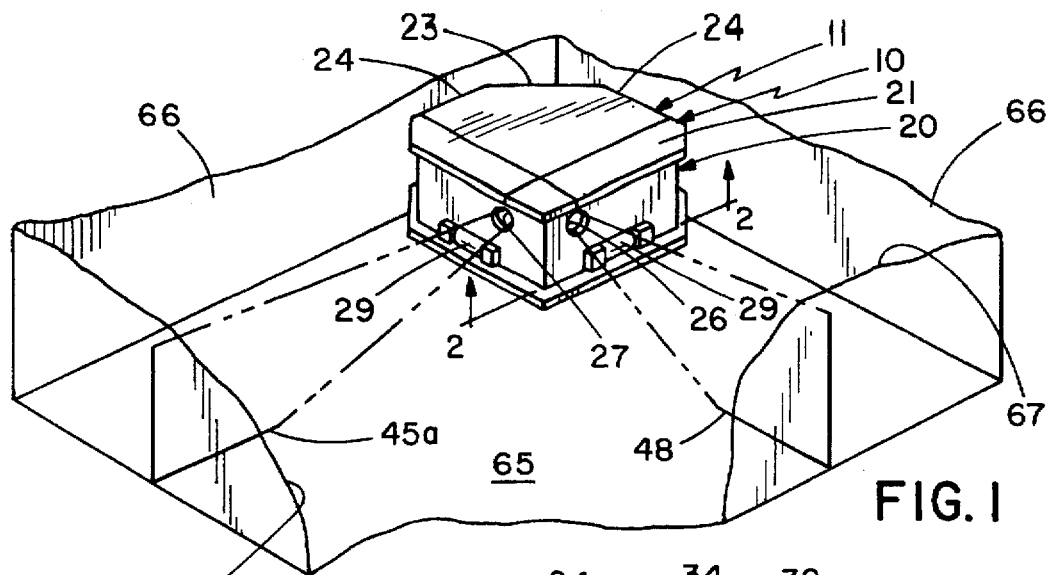
FIG. 1 is a schematic perspective view illustrating the instrument of this invention being utilized to provide diverging vertical planes of light.
Figure 2:
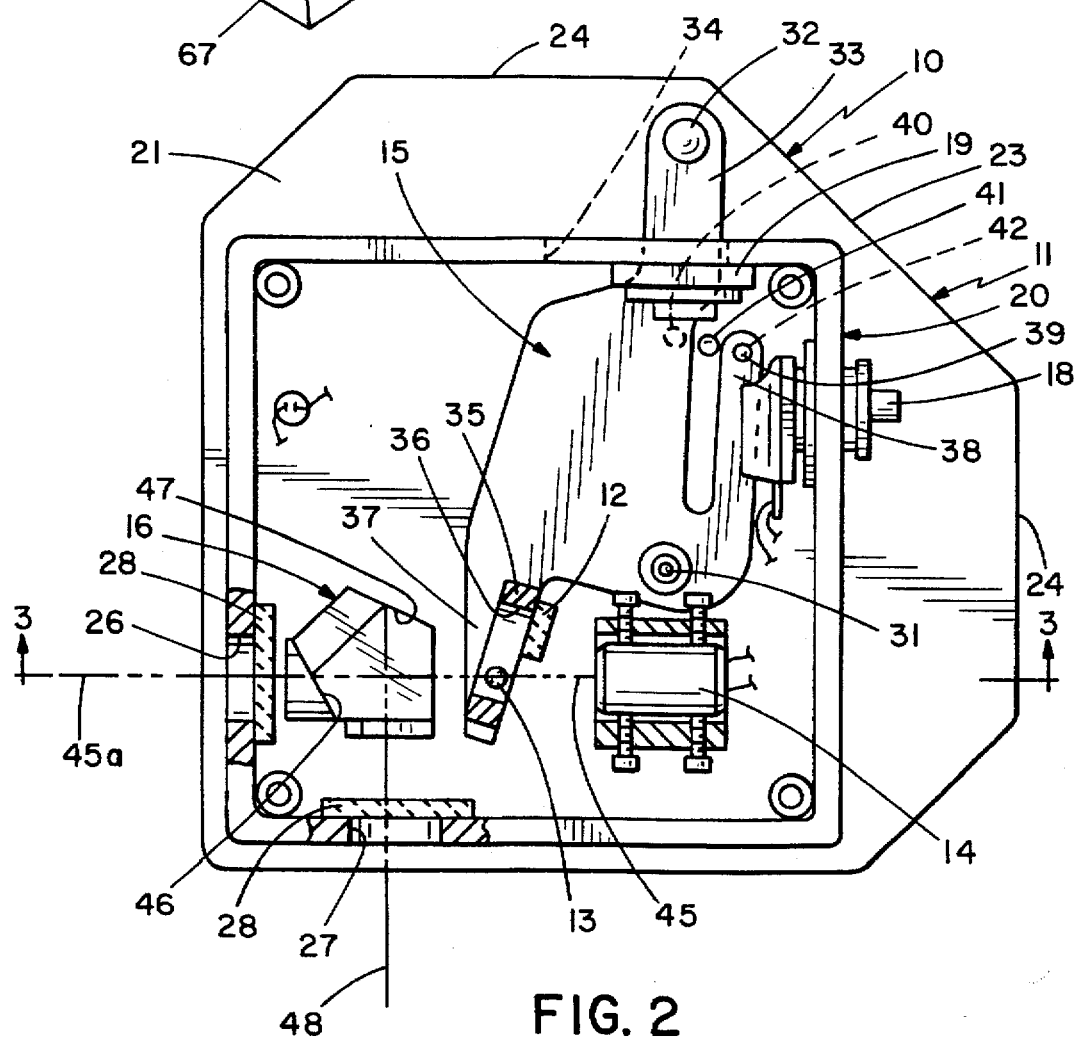
FIG. 2 is a sectional bottom view taken along line 2—2 of FIG. 1 showing the light beam source directed toward selectively positionable refracting lenses and a reflecting means for providing diverging planes of light.
Figure 3:
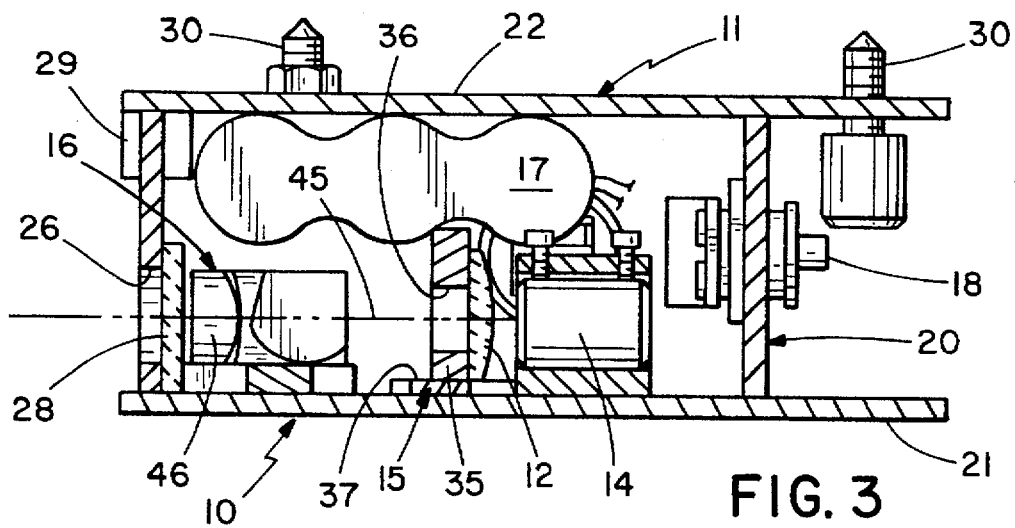
FIG. 3 is a sectional view taken along line 3—3 of FIG. 2 showing the alignment of the light source refracting lens positioning structure and the diverging beam reflector.
Figure 4:
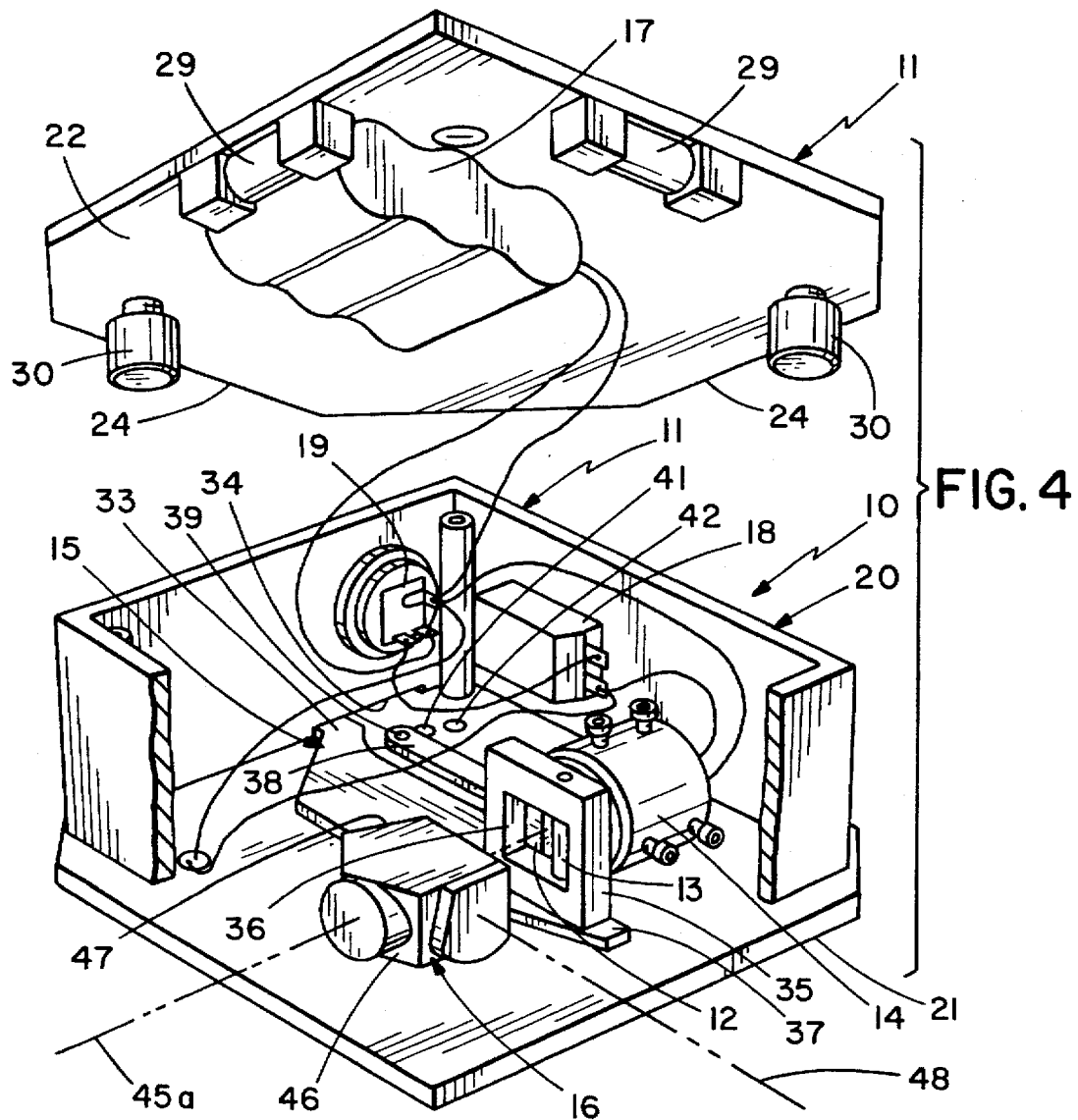
FIG. 4 is a perspective view of the visual alignment instrument of this invention with the bottom of the body of the instrument positioned away from the instrument to illustrate the position of the light beam source, refracting lens positioning mechanism and the light plane diverging reflector relative to the body of the instrument.
Figure 6:
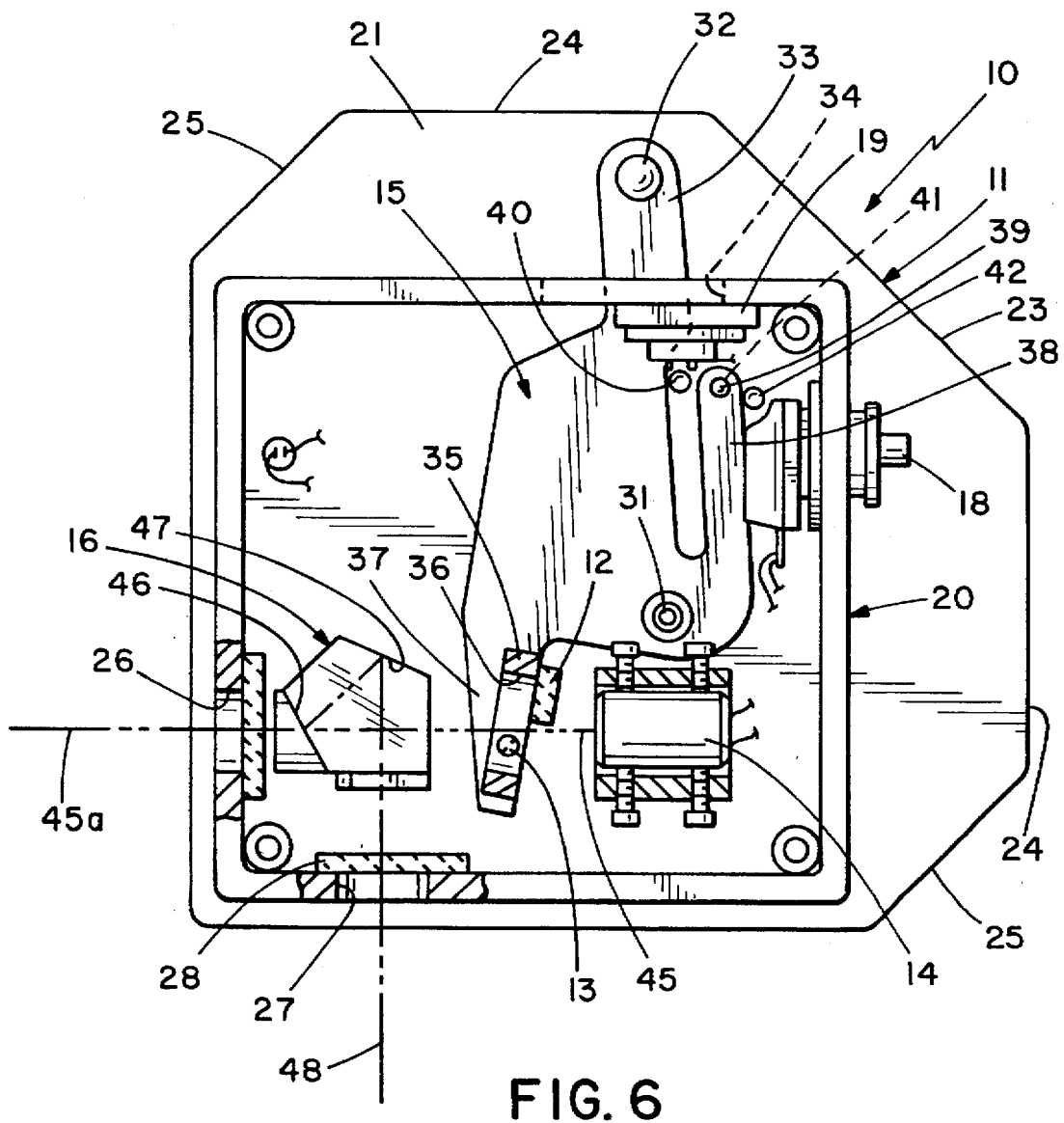
FIG. 6 is a sectional bottom view along line 6—6 of FIG. 5 showing the reflecting lenses positioned out of the line of the light beam showing two divergent light beams.

Lens positioning lever 15 is further provided with a resilient spring arm 38 (FIGS. 2, 4, 6 and 8) having a detent projection 39 extending upwardly against top 21 and adapted to detent into three distinct detent recess sockets 40, 41 and 42, of top 21, when lever 15 is pivoted clockwise about pivot 31 (FIGS. 2, 6 and 8). Detent sockets 40, 41 and 42 thereby provide three positions for lens mount 35 on the other end of lever 15 as lever 15 is thus detentedly positioned. Light beam generator 14 (FIGS. 2–4, 6 and 8–11) is secured to top 21 and adapted to normally direct a concentrated light beam 45 through lens mount opening 36 and beam exit opening 26 of enclosure 20 (FIGS. 1–3, 6–8, 10 and 11).

In the first embodiment of this invention, reflecting element 16 is affixed to top 21 and is a polygonal prism (FIGS. 2–4, 6 and 8) in the path of concentrated beam 45 of generator 14. Reflecting prism 16 is generally transparent except for a partially mirroring surface 46 adapted to reflect a portion of beam 45 to a fully mirrored surface 47. Remaining portion of beam 45 will pass straight through partially mirroring surface 46 and out exit opening 26 as a partial beam 45a. Part of the beam 45, originated by generator 14, is thereby reflected by partial mirrored surface 46 to a mirrored surface 47 and out of prism 16 as beam 48 (FIG. 2) through exit opening 27, of enclosure 20, at a 90° angle to the axis of the original beam 45 and continuing partial beam 45a.

Lens positioning lever 15 is so configured that by pivoting lever 15 about pivot 31 (FIG. 2) to position detent projection in positions 40, 41 and 42, retaining arm 37 of lever 15 will respectively position: lens 12; no-lens space of light beam opening 36; and lens 13, into the path of concentrated light beam 45.

Lens 13 is configured as a rod or cylinder lens which, when positioned in the path of beam 45 (FIGS. 1 and 2), will provide a vertical beam plane 45b into prism reflecting element 16. Reflecting element 16 will, in turn, project a vertical beam plane 45a out exit opening 26 along 45a, as well as a vertical beam plane 48 out exit opening 27 along 48, 90° divergent to vertical beam plane along 45a (FIG. 1).

Figure 5:
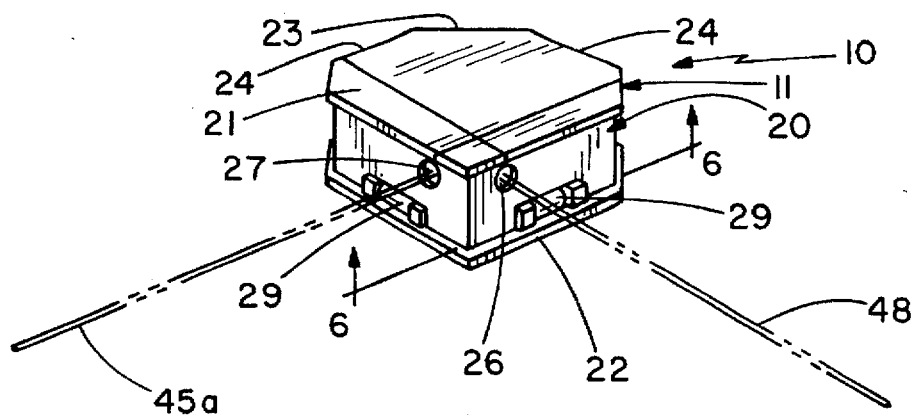
FIG. 5 is a perspective view of the instrument of this invention with the reflecting lenses positioned out of the line of the light beam showing two divergent light beams without any light planes.

Lens positioning lever 15 is so configured that by moving lever 15 about pivot 31 to position detent projection 39 into detent position 41 shown in FIG. 6, retaining arm 37 of lever 15 will respectively position the no-lens space of light beam opening 36 between first lens 12 and second lens 13 into the path of concentrated light beam 45. Line beam 45 will thereby then be directed directly and unaltered into reflecting prism 16 to be reflected as above described, providing two partial concentrated line beams 45a and 48 out exit openings 26 and 27, at a 90° divergent angle between the beams 45a and 48 (FIG. 5).

Lens positioning lever 15 is so configured that by moving lever 15 to detent position 40 (FIG. 8), retaining arm 37 of lever 15 will respectively position first lens 12, of light beam opening 36 in the path of concentrated light beam 45.

Lens 12 is configured as a partial horizontal cylinder lens which, when so positioned in the path of beam 45 (FIGS. 7 and 8), will provide a horizontal beam plane 45b into prism reflecting element 16. Reflecting element 17 will, in turn, project a horizontal beam plane out exit opening 26 along 45a, as well as a horizontal beam plane out exit opening 27 along 48, 90° divergent to horizontal beam plane along 45a (FIG. 7).

The structure of the second embodiment of the invention (FIGS. 9–11) is identical with the structure of the first embodiment of the invention as heretofore described, except for reflecting element 16. In particular, the second embodiment 10a (FIGS. 9–11) of the invention has a reflecting element generally designated by the numeral 16a and comprises a T-shaped frame 55 secured to top 22 generally in, and at a 45° angle to, the path of the beam 45 generated by concentrated light beam generator 14. A 50% reflecting mirror 56 is mounted in an L-shaped frame 57 which, in turn, is secured to the vertical portion of T-frame 55 and the top portion of T-frame 55 secured to top 21.

Compressive grommets 58 are provided between mirror retaining L-frame 57 and the main T-frame 55 whereby the angle of 50% reflecting mirror 56 can be minutely adjusted by machine screws 59 inserted through T-shaped frame 55, grommets 58, and into L-frame 57. Reflecting element 16a is retained to top 21 by machine screws 60 threaded into top 21 holding the 50% reflecting mirror thereof at a 45° angle to concentrated light beam 45 generated by beam generator 14 (FIGS. 9–11).

As a result of this positionment, a portion of beam 45, after beam 45 passes through lens mount opening 36, is allowed to pass through 50% of reflecting mirror along 45a and out opening 26 of enclosure 20. The remaining portion of beam 45 is reflected at 90° along line 48, and out of enclosure 20 through opening 27 (FIG. 11).

As described heretofore, by rotating lens positioning lever 15 (FIGS. 9 and 11) of second embodiment 16a about pivot 31 through detent positions 40, 41 and 42, the instrument 16a of this invention will respectively provide: a diverging vertical light plane beams beyond lens mount 35 (FIGS. 1 and 2); then a concentrated light beam 45a and 48 beyond lens mount 35 (FIGS. 5 and 6); and then horizontal diverging plane beams 45a and 48 (FIGS. 7 & 8).

In operation, instrument 10 or 10a is turned on by actuating laser generator 14 and is typically placed on a horizontal surface such as the floor 65 (FIGS. 1 and 7) or a pedestal (not shown). The thumb screws 30 are then adjusted to level the instrument as indicated by level indicators 29 on adjacent sides of enclosure 20. Lens positioning lever 15 is adjusted to position either of lens 12 or 13, or the space therebetween, as above described, in the path 45 of beam generated by a laser beam generator 14.

If it is desired to produce a vertical image reference lines 48 and 45a (FIG. 1), lens positioning lever 15 is positioned with detent 39 in detent socket 42 (FIG. 2). This will position refracting lens 13 in the path of beam 45 of generator 14 and a vertical beam 45b is emitted therethrough into reflecting element 16 or 16a. Deflection element 16 or 16a, in turn, will deflect beam 45b into two parts providing two vertical beams at 90° from each other (FIG. 1) against opposing walls 67 (FIG. 1) in the path of the horizontal plane beams 45a and 48. It should be noted that beveled surfaces 23 or 25 will allow instrument 10 or 16a to be placed in an irregular corner without affecting the reliability and alignment of instrument 10 or 10a.

If it is desired to produce horizontal reference lines 48 and 45a (FIG. 7), lens positioning lever 15 is positioned with detent 39 in detent socket 40 (FIG. 8). This will position refracting lens 12 in the path of beam 45 of generator 14 and a horizontal beam 45b (FIG. 8) is emitted therefrom into reflecting element 16. Deflection element 16, in turn, will deflect beam 45b into two parts providing two horizontal beams at 90° from each other (FIG. 7) against adjacent walls 66 and 67 in the path of the horizontal plane beams 45a and 48 (FIG. 7).

If it is desired to produce a concentrated beam (FIG. 5), lens positioning lever is positioned with detent 39 in detent socket 41 (FIG. 6). This positions the space between vertical refracting lenses 12 and 13 in the path 45 of generator 14 and an unaltered beam 45 is emitted therethrough into reflecting element 16 or 16a. Deflection element 16 or 16a, in turn, will deflect beam 45 into two parts providing divergent beams at 90° from each other (FIG. 5) against walls in the path of the beams.

It is to be understood that the invention is not to be limited to the specific construction and arrangements shown and described, as it will be understood to those skilled in the art that certain changes may be made without departing from the principles of the invention.

What is claimed is:

1. A visual alignment instrument comprising an instrument body frame, a first refracting light lens positioned on the said frame and adapted to convert a first beam of light from a light beam generator into a projected plane of light, a second refracting light lens positioned said frame and adapted to convert said first beam of light from said light beam generator into a projected light plane at an angle to said first plane of light, said light beam generator secured to said frame and generating said first beam of light relative to said frame, means for selectively and alternately positioning said first and second lenses in three positions relative to said body frame out of the path of said first light beam to respectively provide an intermediate unaltered light beam or alternatively two intermediate light beams each respectively located along one of said planes, and reflecting means in the path of said first light beam beyond said selective means for deflecting a portion of the power of any selected one of said intermediate beams to divide said first beam into dual output diverging beams of the same physical character of said selected intermediate beam to provide three selectable alignment indication output beams relative to said instrument.

2. A visual alignment instrument as defined in claim 1 wherein said light beam generator is a laser beam generator.

3. A visual alignment instrument as defined in claim 1 wherein said instrument frame is provided with means to level said frame to similarly control the position of the selected beams relative to said instrument.

4. A visual alignment instrument as defined in claim 1 wherein said second projected light plane angle is 90° to said first projected light plane to provide said selected alignment indications at 90° from each other from said instrument.

5. A visual alignment instrument as defined in claim 1 wherein said positioning means comprises a lever having said lenses mounted thereto and being pivotally mounted to said frame to provide said three positions in the path of said first beam relative to said instrument frame.

6. A visual alignment instrument as defined in claim 5 wherein said positioning lever is detented with respect to said frame to provide three determined positions relative to said frame for positively positioning said lenses in said three positions as said lever is pivoted.

7. A visual alignment instrument as defined in claim 2 wherein said positioning means comprises a lever having said lenses mounted thereto and being pivotally mounted to said frame and detented with respect to said frame to provide three determined positions relative to said frame for positively positioning said lenses in said three positions as said lever is pivoted.

8. A visual alignment instrument as defined in claim 7 wherein said second projected light plane angle is 90° to said first projected light plane to provide said selected alignment indications at 90° from each other.

9. A visual alignment instrument as defined in claim 8 wherein said instrument frame is provided with means to level said frame to similarly control the level of said selected beams provided by said instrument.

10. A visual alignment instrument as defined in claim 1 wherein said reflecting means comprises a pentagonal prism lens having a first transparent side to receive said intermediate beam therethrough, a second transparent side adjacent said first side and parallel to said intermediate beam, a third mirrored side at an angle to said intermediate beam adapted to deflect said portion of the power of said intermediate beam within said prism to a fifth side of said prism and the balance of the power of said intermediate beam out of said prism, a fourth side adjacent said three sides, a fifth mirrored side adapted to receive and reflect said portion of said intermediate beam 90° to said first beam for providing an output beam divergent from said portion of said first beam passed through said prism, said positioning means comprises a lever having said lenses mounted thereto and being pivotally mounted to said frame and detented with respect thereto to provide three positive detent pivot positions relative to said frame for positively positioning said lenses in said three positions.

11. A visual alignment instrument as defined in claim 3 wherein said reflecting means comprises a pentagonal prism lens having a first transparent side to receive said intermediate beam therethrough, a second transparent side adjacent said first side and parallel to said intermediate beam, a third mirrored side at an angle to said intermediate beam adapted to deflect said portion of the power of said intermediate beam within said prism to a fifth side of said prism and the balance of the power of said intermediate beam out of said prism, a fourth side adjacent said three sides, a fifth mirrored side adapted to receive and reflect said portion of said intermediate beam 90° to said first beam for providing an output beam divergent from said portion of said first beam passed through said prism, said positioning means comprises a lever having said lenses mounted thereto and being pivotally mounted to said frame and detented with respect thereto to provide three positive detent pivot positions relative to said frame for positively positioning said lenses in said three positions.

12. A visual alignment instrument as defined in claim 4 wherein said reflecting means comprises a pentagonal prism lens having a first transparent side to receive said intermediate beam therethrough, a second transparent side adjacent said first side and parallel to said intermediate beam, a third mirrored side at an angle to said intermediate beam adapted to deflect said portion of the power of said intermediate beam within said prism to a fifth side of said prism and the balance of the power of said intermediate beam out of said prism, a fourth side adjacent said three sides, a fifth mirrored side adapted to receive and reflect said portion of said intermediate beam 90° to said first beam for providing an output beam divergent from said portion of said first beam passed through said prism, said positioning means comprises a lever having said lenses mounted thereto and being pivotally mounted to said frame and detented with respect thereto to provide three positive detent pivot positions relative to said frame for positively positioning said lenses in said three positions.

13. A visual alignment instrument as defined in claim 7 wherein said reflecting means comprises a pentagonal prism lens having a first transparent side to receive said intermediate beam therethrough, a second transparent side adjacent said first side and parallel to said intermediate beam, a third mirrored side at an angle to said intermediate beam adapted to deflect said portion of the power of said intermediate beam within said prism to a fifth side of said prism and the balance of the power of said intermediate beam out of said prism, a fourth side adjacent said three sides, a fifth mirrored side adapted to receive and reflect said portion of said intermediate beam 90° to said first beam for providing an output beam divergent from said portion of said first beam passed through said prism said positioning means comprises a lever having said lenses mounted thereto and being pivotally mounted to said frame and detented with respect thereto to provide three positive detent pivot positions relative to said frame for positively positioning said lenses in said three positions.

14. A visual alignment instrument as defined in claim 9 wherein said reflecting means comprises a pentagonal prism lens having a first transparent side to receive said intermediate beam therethrough, a second transparent side adjacent said first side and parallel to said intermediate beam, a third mirrored side at an angle to said intermediate beam adapted to deflect said portion of the power of said beam within said prism to a fifth side of said prism and the balance of the power of said intermediate beam out of said prism, a fourth side adjacent said three sides, a fifth mirrored side adapted to receive and reflect said portion of said intermediate beam 90° to said first beam for providing an output beam divergent from said portion of said first beam passed through said prism said positioning means comprises a lever having said lenses mounted thereto and being pivotally mounted to said frame and detented with respect thereto to provide three positive detent pivot positions relative to said frame for positively positioning said lenses in said three positions.

15. A visual alignment instrument as defined in claim 14 wherein said instrument frame is provided with means to level said frame to similarly control the level of the selected beams provided by said instrument.

16. A visual alignment instrument as defined in claim 1 wherein said reflecting means comprises a mirror positioned at a 45° angle to said intermediate beam and adapted to receive and deflect said portion of the power of said intermediate beam 90° to said first beam for providing said output beam divergent to said first beam.

17. A visual alignment instrument as defined in claim 16 wherein said positioning means comprises a lever having said lenses mounted thereto and being pivotally mounted to said frame and. detented with respect to said frame to provide three determined positions relative to said frame for positively positioning said lenses in said three positions as said lever is pivoted.

18. A visual alignment instrument as defined in claim 17 wherein said instrument frame is provided with means to level said frame to similarly control the position of the selected intermediate beams relative to said instrument.

* * * * *